United States Patent

Moore

[15] 3,702,440

[45] Nov. 7, 1972

[54] SELECTIVE CALLING SYSTEM PROVIDING AN INCREASED NUMBER OF CALLING CODES OR AUXILIARY INFORMATION TRANSFER

[72] Inventor: George G. Moore, Chicago, Ill.

[73] Assignee: Motorola, Inc., Franklin Park, Ill.

[22] Filed: Nov. 16, 1970

[21] Appl. No.: 89,867

[52] U.S. Cl. ......................325/55, 325/64, 325/302, 325/466

[51] Int. Cl. ..............................................H04b 1/16

[58] Field of Search..........325/55, 64, 182, 302, 304, 325/305, 306, 452, 467, 466, 468; 340/171, 172, 184; 343/225, 228

[56] References Cited

UNITED STATES PATENTS 3,496,467 2/1970 Lundgren ................325/64 X

OTHER PUBLICATIONS

J. G. DeGraaf, " Selective Paging System" Electronics, Feb. 26, 1960, pp. 68–70

*Primary Examiner*—Robert L. Richardson
*Assistant Examiner*—Kenneth W. Weinstein
*Attorney*—Mueller & Aichele

[57] ABSTRACT

The selective calling system includes a transmitter having first and second signal generators providing sinusoidal and rectangular signals which are combined to form a modulated calling signal. Each receiver of the system includes a first demodulator which demodulates the modulated calling signal and a second demodulator which demodulates the rectangular signal. A frequency selective device connects the first demodulator to a first input of an AND gate and a repetition rate selective device connects the second demodulator to a second input of the AND gate. If the demodulated frequency and repetition rate are within the passbands of the devices, the AND gate provides a turn-on signal which allows primary information to be reproduced by the receiver. The system can be modified so that auxiliary information is transferred to the receivers by the calling signal.

15 Claims, 3 Drawing Figures

Inventor
GEORGE G. MOORE
BY
Mueller & Aichele
ATTYS.

SELECTIVE CALLING SYSTEM PROVIDING AN INCREASED NUMBER OF CALLING CODES OR AUXILIARY INFORMATION TRANSFER

BACKGROUND OF THE INVENTION

In some communication systems it is desirable that only selected ones of a plurality of receivers reproduce a particular information signal being transmitted on a specific carrier frequency to which they are all tuned. One such communication system employs a plurality of normally silent receivers, each having a series information signal path including: an input stage, a normally nonconductive squelch stage, and an information signal reproducing stage. A control signal path runs from the output of the input stage to a control terminal associated with the squelch stage and includes a frequency responsive device which is resonant at a particular calling frequency and which, therefore, passes only a narrow band of frequencies. This band is exclusive of the band which is passed by similar frequency selective devices which are resonant at other calling frequencies and which are included in the other receivers of the system.

When it is desired to communicate information through a particular receiver, a calling signal having a frequency within the band of the selective calling device or calling code of that receiver is continuously transmitted along with the information. In response to the calling code, a turn-on signal is developed at the output of the frequency responsive device which renders the squelch stage conductive so that the accompanying information signal is conducted from the input stage, through the squelch stage and applied to the information signal reproducing stage, which may include an audio amplifier cooperating with a speaker. Therefore, if it is desired to communicate through a particular receiver, the information signal and a continuous calling signal, which lies within the pass band of the frequency selective device for that receiver, must be simultaneously transmitted.

There are practical limits imposed upon the permissible range of frequencies within which such calling signals may lie. For instance, because of the crowded conditions of the radio spectrum and the necessity of avoiding interference between adjacent stations, the bandwidths of all radio transmissions must be kept within definite limits. Since the bandwidth is proportional to the frequency of the modulating signal, it may be necessary that the permissible range of frequencies for the above mentioned calling signal be confined to the audio frequency portion of the spectrum. Also, it may be desirable to filter the calling signal from the information signal which may be an aural signal. In this case, the calling signal should have a frequency which can be removed from an information signal without producing a deleterious reduction in the quality of the information. The foregoing restraints tend to establish a maximum limit for the range of calling frequencies somewhere in the lower portion of the audio frequency spectrum. Moreover, the input stages of the receivers of the system have a lower cut-off frequency which establishes a minimum limit for such calling frequency range.

There is also a restriction on frequency spacing between adjacent calling signals imposed by the fact that frequency responsive devices operating in the lower portion of the audio frequency spectrum have pass bands of a minimum width. Thus, the calling signals must be spaced with respect to each other so that the devices of the foregoing receivers are not undesirably operated by calling signals having frequencies adjacent to the resonant frequency thereof. Otherwise, the squelch stages thereof would undesirably be rendered conductive. Because of the aforementioned practical considerations, which limit the permissible calling frequency range and spacing within that range, there is a maximum number of calling signals that can be employed in any fixed carrier, selective calling system employing continuous single frequency calling signals. This maximum number of calling frequencies undesirably limits the number of receivers having different calling codes included in a given system.

One prior art system for increasing the number of calling codes is disclosed by U.S. Pat. No. 3,546,674; entitled Plural Timer Tone Burst Selective Calling System; inventor Cannalte et al.; dated Dec. 8, 1970 and which is assigned to the assignee of the present invention. The prior art system utilizes signal bursts of a predetermined frequency and time interval to facilitate selective calling.

SUMMARY OF THE INVENTION

One object of the present invention is to provide a simple, inexpensive receiver selecting communications system.

Another object of the invention is to provide a narrow band calling system utilizing an amplitude modulated single frequency calling signal to provide a plurality of different calling codes which depend on a characteristic of the modulating signal, and each of which selectively activates one of a plurality of receivers.

A further object of the invention is to provide a selective calling circuit which can be readily installed in an existing selective calling system utilizing single frequency, continuous sinusoidal calling signals to increase the possible number of different calling codes without substantially increasing the required bandwidth.

A still further object of the invention is to utilize a continuous, selective calling signal for transferring auxiliary information from a transmitter to a receiver.

In brief, a selective calling system is provided for facilitating communication between a transmitter and selected ones of a plurality of normally silent receivers, each of which is rendered operative in response to a turn-on signal generated therein in response to a particular calling code. The transmitter includes at least one first signal generator providing a sinusoidal calling signal of predetermined frequency at its output; at least one second signal generator providing a rectangular calling signal at its output; and a switching modulator having its input connected to the first signal generator and its control input connected to the second signal generator. The switching modulator decreases the amplitude of the sinusoidal calling signal only during either the high or the low level portions of the rectangular calling signal to thereby amplitude modulate the sinusoidal calling signal with the rectangular signal. The amplitude modulated calling signal is applied to the master modulator of the transmitter so that it, along with an accompanying information signal, modulates the carrier and is transmitted to all of the normally silent receivers.

First and second demodulators are included in each of the receivers. The first demodulator provides the amplitude modulated calling signal at the output thereof. The second demodulator responds to the modulated calling signal to provide the rectangular modulating signal at its output. A frequency selective device is connected from the output of the first demodulator to a first input of an AND gate and a repetition rate selective device is connected from the output of the second demodulator to a second input of the AND gate. The output of the AND gate is coupled to a normally nonconductive squelch stage within the receiver. If the frequency of the sinusoidal calling signal has been selected to be within the pass band of the frequency selective device, and if the repetition rate of the rectangular calling signal has been selected to be within the pass band of the repetition rate selective device, first and second control signals are simultaneously applied to the AND gate, which produces the turn-on signal at its output. Hence, this turn-on signal indicates that the proper calling code for the receiver has been received and renders the nonconductive squelch stage of the particular receiver operative so that the information signal passes therethrough. Since rectangular calling signals having a plurality of permissible repetition rates can be selected for use with each sinusoidal calling signal, the number of possible calling codes is multiplied with respect to the number that is possible if only unmodulated calling signals are employed. The system can be adapted so that the sinusoidal calling signals convey auxiliary information.

DETAILED DESCRIPTION OF THE PREFERRED EMBODIMENT

Figures 1, 2, 3:
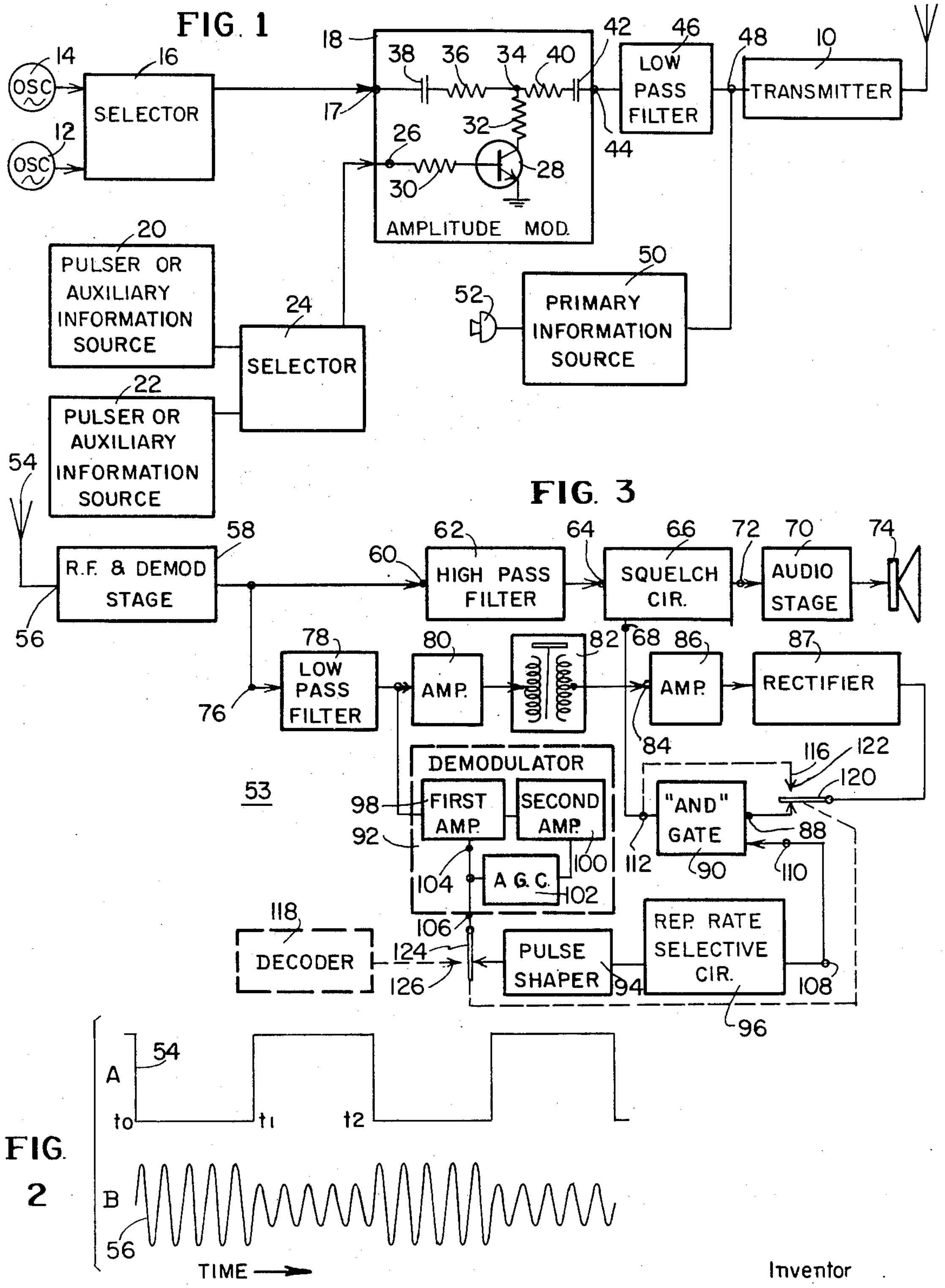
FIG. 1 is a partial block and schematic diagram of a transmitter employing selective calling encoding circuitry of one embodiment of the invention.
FIG. 2 illustrates the wave forms of the signals used in the system of the invention.
FIG. 3 is a block diagram of a receiver containing a selective receiving or decoding provision which cooperates with the transmitter of FIG. 1.

In FIG. 1, transmitter 10 is disclosed which selectively communicates with any one of a plurality of receivers by sending a particular calling code and an information signal thereto. Oscillators 12 and 14 are illustrative of a plurality of oscillators each having an input connected to one of a plurality of inputs of selector 16. The number of such oscillator determines in part the maximum number of possible receiver calling codes provided in the selective calling systems. These oscillators provide sinusoidal calling signals having constant amplitudes and different predetermined constant frequencies. The frequencies may be selectively chosen and spaced across a portion of the lower part of the audio frequency range, e.g., from 60 to 200 hertz (Hz). Selector 16 is arranged to provide only a particular one of the sinusoidal calling signals at its output, which is connected to input 17 of amplitude or switching modulator 18.

Pulsers or auxiliary information sources 20 and 22 are illustrative of a plurality of rectangular signal generators which provide rectangular waveforms at the outputs thereof having either different repetition rates or different auxiliary information bearing pulse trains, depending upon the application thereof. Selector 24, which has inputs connected to each of the outputs of the rectangular signal generators 20 and 22, is arranged to apply the rectangular signal from either source 20 or source 22 to the control electrode 26 of modulator 18.

Modulator 18 includes normally nonconductive transistor 28 having its emitter connected to a reference potential, its base connected through resistor 30 to control electrode 26 and its collector connected through resistor 32 to circuit junction 34. Resistor 36 and capacitor 38 connect junction 34 to input terminal 17. Resistor 40 and capacitor 42 connect junction 34 to modulator output terminal 44. Low pass filter 46 is connected between modulator output 44 and input 48 of the master modulator for transmitter 10.

Primary information source 50, which may include a microphone 52 and an audio amplifier, is also connected to the master modulator input 48 of transmitter 10.

If transmitter 10 and its associated circuitry is employed in a selective calling mode, selector 16 is operated to select a sinusoidal calling output of a particular frequency, and selector 24 is operated to select a rectangular calling wave of a particular repetition rate. The highest repetition rate of the rectangular calling signals must be no greater than about one-fourth the lowest frequency of the sinusoidal calling signals to facilitate information transfer. The selected frequency and repetition rate correspond to a two digit calling code for rendering a particular normally silent receiver or receivers operative in a manner which will subsequently become clear.

Referring to FIG. 2, waveform 54 illustrates the rectangular calling signal which is applied to input 26 of modulator 18. The series path through capacitor 38, resistor 36, resistor 40 and capacitor 42 offers relatively little impedance to the sinusoidal calling signal applied to input 17. Thus, between times $T_0$ and $T_1$, while signal 54 is at a first or low level, transistor 28 remains nonconductive, and the greater portion of the amplitude of the sinusoidal calling signal applied at input 17 appears at output 44 of amplitude modulator 18. Between times $T_1$ and $T_2$, however, signal 54 is at a second or high level which renders transistor 28 conductive which, in essence, connects the reference potential to one end of resistor 32. While transistor 28 is conductive, the combination of resistor 36 and resistor 32 form a voltage divider which decreases the amplitude of the sinusoidal signal occurring at output 44. Thus, as shown in FIG. 2, during the time the rectangular signal is at a lower level, the sinusoidal calling signal 56 at output terminal 44 has a high amplitude, and, during the time the rectangular signal is at a high level, the sinusoidal calling signal has a relatively low amplitude. The modulated calling signal occupies about the same portion of the frequency spectrum as an unmodulated calling signal. The modulator circuit should be designed such that the sinusoidal calling signal is amplitude modulated no more than about 25 percent by the rectangular calling signal to avoid creating spurious responses, e.g., if the sinusoidal calling signal has an amplitude of 1 volt between times $T_0$ to $T_1$ its amplitude should be reduced to no less than 0.75 volt between times $T_1$ to $T_2$. Also the highest repetition rate of the rectangular calling signal should be at least one-fourth the lowest frequency of the sinusoidal calling signals to facilitate demodulation.

Capacitors 38 and 42 suppress transients and direct current (DC) level shifts caused by the switching of transistor 28 which otherwise might be coupled to the selected oscillator or transmitter. Low pass filter 46 conducts signal 56 to input 48 of the master modulator of transmitter 10 while preventing unwanted harmonic signals, possibly caused by modulator 18 from causing spurious signals at the output of transmitter 10. Transmitter 10 may be amplitude, frequency or phase modulated by amplitude modulated signal 56 and the information signal supplied by source 50.

The composite signal being transmitted by transmitter 10, which includes amplitude modulated calling signal 56 and an information signal provided by primary information source 50, is received by each of a plurality of normally silent receivers which have input stages tuned to the carrier frequency of the transmitter. In FIG. 3, a block diagram of one of these receivers 53 is disclosed. Antenna 54 of receiver 53 is connected to input 56 of radio frequency (RF) and demodulating stage 58 which receives and demodulates transmitted signals without regard to whether the signals are to be reproduced at the output of receiver 53.

A high pass filter 62 has an input 60 connected to the output of RF and demodulating stage 58. High pass filter 62 allows only those audio frequencies above the maximum limit of the range of frequencies within which a selective calling signal might lie to be conducted therethrough. More specifically, if the range of possible sinusoidal callings is between 65 and 200 Hz, filter 62 is designed to pass only frequencies greater than about 210 Hz. The frequencies below 210 Hz can be excluded from an audio or voice information signal without adversely affecting the quality thereof. Therefore, high pass filter 62 prevents calling signals from interfering with the information signal occurring at its output. The output of filter 62 is connected to input 64 of normally nonconductive squelch circuit 66. Information signals occurring at the output of high pass filter 64 are passed through the squelch circuit 66 only during the existence of a turn-on signal at its control terminal 68. The input 72 of audio stage 70 is connected to the output of squelch circuit 66. Audio stage 70 amplifies and applies information signals occurring at the output of circuit 66 to loudspeaker 74.

The foregoing turn-on signal is developed by the selective calling circuitry connected between terminals 60 and 68 only if a proper calling code is transmitted by transmitter 10. The calling code being transmitted is determined by the frequency of sinusoidal calling signal 56 and by the repetition rate of its change in amplitude. Terminal 60 is connected to input 76 of low pass filter 78 which prevents all audio frequencies above the maximum range within which a selective calling signal might lie, e.g., about 210 Hz, from passing therethrough. Hence, amplitude modulated, sinusoidal signals of the form shown in FIG. 2 occur at the output of low pass filter 78, which prevents the information signal from interfering with the selective calling function.

The output of low pass filter 78 is connected through first and second series circuits to inputs of an AND gate. The first series circuit includes amplifier 80 which has an input connected to the output of filter 78 and which increases or limits the amplitude of the sinusoidal calling signals and applies them to frequency selective device 82.

Device 82 has a preselected resonant frequency, a narrow bandwidth, and a frequency-phase response characteristics similar to those of a high Q tuned circuit. An electromechanical device of the form disclosed in Reissue U.S. Pat. No. 26,361 entitled Electromechanical Frequency Responsive Translating Device, which issued on Mar. 12, 1968 to Charles W. Mooney et al., and which is assigned to the assignee of the present invention may be employed as device 82. Device 82, having an output connected to input 84 of amplifier 86, provides a sinusoidal output signal of sufficient amplitude to activate amplifier 86, only if one of the sinusoidal calling signals applied thereto has a predetermined frequency.

Amplifier 86 amplifies the sinusoidal signal appearing at the output of device 82. Rectifier 87, which is connected from the output of amplifier 86 to a first input 88 of AND gate 90, responds to a sinusoidal signal at the output of amplifier 86 to provide a first DC control signal to input 88 of gate 90.

The second series circuit is connected between the output of filter 78 and the other input of AND gate 90. It includes demodulator 92, pulse shaper 94, and repetition rate selective circuit 96. Demodulator 92 includes first amplifier 98, second amplifier 100 and an automatic gain control (AGC) feedback loop 102, which is connected from the output of amplifier 100 to a control terminal 104 associated with amplifier 98. Amplifiers 98 and 100 can be combined in a single amplifier which provides a phase inversion between its input and output.

The feedback loop develops a negative feedback voltage having an amplitude proportional to the amplitude of the signal applied to amplifier 98. As previously mentioned the output signal of low pass filter 78 is of the form depicted by waveform 56 of FIG. 2B. Thus, loop 102 senses the amplitude of the modulated calling signal at the output of amplifier 100 and produces a control signal corresponding to the envelope of signal 56 to derive or demodulate the rectangular calling signal. More specifically, referring to FIG. 2, during the time between $T_0$ and $T_1$, when the amplitude of signal 56 is at a low level, the DC output level of the feedback signal at loop output 106 will be a first high value corresponding to the portion of rectangular waveform 54 occurring between time $T_0$ and $T_1$. During the time between $T_1$ and $T_2$, when the amplitude of signal 56 is at a high level, the DC output level of the feedback signal at terminal 106 is at a second or low value corresponding to the portion of signal 54 occurring between times $T_1$ and $T_2$. Therefore, demodulator 92 responds to a rectangularly amplitude modulated, sinusoidal signal 56 to demodulate the rectangular modulation therefrom.

Pulse shaping circuit 94 removes irregularities from the demodulated rectangular calling signal occurring at output 106 of AGC circuit 102. Repetition rate selective circuit 96 develops a second DC control signal at output 108 thereof in response to only a rectangular waveform having a predetermined repetition rate. The circuit of the aforementioned Cannalte reference could be modified to form repetition rate selective circuit 96 or other circuits known to those skilled in the art could be employed therefor. Output 108 of repetition rate selective circuit 96 is connected to second input 110 of AND gate 90.

Provided that the first and second DC control signals are simultaneously applied to inputs 88 and 110, AND gate 90 produces the aforementioned turn-on signal at its output 112 which is connected to the control electrode 68 of squelch circuit 66. Therefore, if the operator of transmitter 10 has arranged selector 16 to connect an oscillator having a resonant frequency substantially equal to the resonant frequency of device 82 and selector 24 to connect a pulser providing an output signal having a repetition rate substantially equal to the repetition rate passed by selective circuit 96, squelch circuit 66 is rendered conductive. In response, squelch circuit 66 passes the information signal provided by source 50. Thus, the information signal is amplified by audio stage 70 and reproduced at loudspeaker 74 only during the existence of the proper calling code. The above described selective calling system not only allows a plurality of selective spaced sinusoidal calling signals to be employed, but also allows a plurality of pulsers to be employed with each particular sinusoidal calling signal thereby making the total number of available calling codes equal to the number of oscillators multiplied by the number of pulsers.

The above described system can be converted to utilize the sinusoidal calling signal to transfer digital information other than receiver selecting information. In performing this conversion, one of pulser circuits 20 or 22 at the transmitter is converted to supply the digital information to be transmitted which may be the "call" letters of the transmitter, for example. Moreover, the output of rectifier 87 of the receiver is connected through dashed conductor 116 directly to control terminal 68 of squelch circuit 66 by operating switch 120 to engage contact 122. Also, output 106 of AGC circuit 102 is connected to a decoder or digital information utilization device 118 by operating switch 124, which may be ganged with switch 120, to engage contact 126. Pulse shaper 94, repetition rate selective circuit 96 and AND gate 90 are thus eliminated from the receiver circuit.

In operation, squelch circuit 66 is rendered conductive in response to transmitter 10 sending a sinusoidal calling signal having a frequency substantially equal to the resonant frequency of device 82. Squelch circuit 66, while conductive, applies information from source 50 to audio stages 70 and speaker 74. Digital information, in the form of a rectangular signal and modulated on the selective calling tone by modulator 18 is demodulated by demodulator 92 independently of the squelch function in the manner previously described. The existance of the rectangular modulation signal does not interfere with the selective calling function because device 82 is primarily frequency, not amplitude, responsive. The digital information could include the station designation of transmitter 10, expressed in Morse code, telemetering data or other control signals.

What has been described, therefore, is a simple inexpensive receiver selecting communication system which provides a large number of different calling codes and operates in a constrained bandwidth. Moreover, the system can be readily installed in an existing selective calling system utilizing a plurality of either single frequency or different frequency, sinusoidal calling signals to increase the possible number of different calling codes without substantially increasing required bandwidth. The disclosed circuitry can be readily converted to employ a continuous, sinusoidal calling signal for translating an auxiliary information signal from the transmitter to the receivers of the single frequency system without interfering with the normal operation of a selective calling provision included therein.

I Claim:

1. A calling system facilitating the communication of an information signal between a transmitter and selected ones of a plurality of normally silent receivers tuned to the transmitter, the selected ones of the receivers reproducing the information signal in response to a particular amplitude modulated calling signal sent simultaneously with the information signal, such calling system including in combination:

first signal generating means providing sinusoidal calling signals at its output terminals of a plurality of different selected frequencies, which sinusoidal calling signals have amplitudes of a first value;

first selector means having input terminals connected to said output terminals of said first signal generating means and an output terminal, said first selector means being operated to provide a chosen sinusoidal calling signal of a particular frequency at its output terminal;

second signal generating means providing rectangular calling signals at its output terminals of a plurality of different selected repetition rates;

second selector means having input terminals connected to said output terminals of said second signal generating means, said second selector means being operated to provide a chosen rectangular calling signal of a particular repetition rate at its output terminal;

modulating means having an input terminal connected to said output terminal of said first selector means, a control terminal connected to said output terminal of said second selector means and an output terminal, said modulating means changing said amplitude of said first value of said chosen sinusoidal calling signal to a second value which is greater than zero in response to said chosen rectangular calling signal, said modulating means thereby forming an amplitude modulated calling signal at its output terminal; and first circuit means connecting said output terminal of said modulating means to the transmitter.

2. The calling system of claim 1 wherein said modulating means is comprised of:

an electron control device having first, second and third electrodes;

first resistor means having a first end connected to said first electrode of said electron control device and a second end;

second circuit means connecting said input terminal of said modulating means to said second end of said first resistor means;

third circuit means connecting said output terminal of said modulating means to said second end of said first resistor means;

fourth circuit means connecting said second electrode of said electron control device to said control terminal of said modulating means;

first circuit means coupling said third electrode of said electron control device to a reference potential, said electron control device being rendered conductive and nonconductive in response to said chosen rectangular calling signal thereby causing said reference potential to be alternately connected to and disconnected from said first end of said first resistor means, said second circuit means and said first resistor means forming a voltage divider only during the times that said electron control device is conductive so that the level of the amplitude of said chosen sinusoidal calling signal varies between said first and second values in response to said chosen rectangular calling signal.

3. The calling system of claim 2 wherein said second circuit means and said third circuit means each include resistor-capacitor networks.

4. The calling system of claim 1 wherein said first circuit means includes a low pass filter having an upper cut-off frequency which is greater than any one of said frequencies of said sinusoidal calling signals.

5. The calling system of claim 1 wherein the maximum of said different selected repetition rates of said rectangular calling signals is less than one-fourth the minimum of said different selected frequencies of said sinusoidal calling signals.

6. The calling system of claim 1 further comprised of a decoder means which includes:

first demodulating means one of which is included in each of the receivers, each of said first demodulating means providing said amplitude modulated calling signal at an output terminal thereof;

frequency selective means one of which is included in each of the receivers, each of said frequency selective means being responsive to a sinusoidal calling signal of a predetermined frequency and having an input terminal and an output terminal;

sixth circuit means connecting output terminal of one of said first demodulating means to said input terminal of one of said frequency selective means, said frequency selective means providing a first control signal at said output terminal thereof in response to said frequency of said chosen sinusoidal calling signal being substantially equal to the predetermined frequency to which said frequency selective means responds;

second demodulating means each having an input terminal connected to said output terminal of one of said first demodulating means and an output terminal, each of said second demodulating means being responsive to said amplitude modulated calling signal to provide said chosen rectangular calling signal at its output terminal;

repetition rate selective means included in each of the receivers, each of said repetition rate selective means being responsive to a predetermined repetition rate and having an input terminal connected to said output terminal of one of said second demodulating means and an output terminal, said repetition rate selective means providing a second control signal at said output terminal thereof in response to said repetition rate of said chosen rectangular calling signal being substantially equal to said predetermined rate; and gate means included in each of the receivers, each of said gate means having a first input terminal connected to said output terminal of one of said frequency selective means, a second input terminal connected to said output terminal of one of said repetition rate selective means, and an output terminal, said gate means being responsive to said first and second control signals to provide a turn-on signal which enables the selected normally silent receiver to reproduce the information signal.

7. The calling system of claim 6 wherein each of said frequency selective means includes an electromechanical frequency responsive device.

8. The calling system of claim 6 wherein said sixth circuit means includes a low pass filter having an upper cut-off frequency which is only slightly greater than the maximum frequency of said selected frequencies of said sinusoidal calling signals.

9. The calling system of claim 6 wherein said second demodulating means includes:

an amplifier means having input, output and control terminals, said input terminal being connected to said output of said first demodulating means so that said amplitude modulated calling signal is applied thereto; and automatic gain control means having an input terminal connected to said output terminal of said amplifier means and an output terminal connected to said control terminal of said amplifier means, said automatic gain control means being responsive to said first and second values of the amplitude of said amplitude modulated calling signal to provide said chosen rectangular calling signal at said output terminal thereof.

10. In a selective calling system having a transmitter with a signal generator providing a continuous sinusoidal calling signal having an amplitude of a first magnitude and any one of a plurality of different selected frequencies, a primary information supply providing an information signal, and a master modulator connected with said signal generator and said primary information supply for developing a composite signal which is transmitted, and a plurality of normally silent receivers each of which includes a first demodulator, an information reproducing stage, a switchable circuit connected between the first demodulator and an information reproducing stage, the switchable circuit being normally nonconductive and being rendered conductive in response to a turn-on signal, a frequency selective device which is connected between the output of the first demodulator and the switchable circuit and which is responsive to a sinusoidal calling signal of a predetermined frequency provided by the signal generator of the transmitter to provide the turn-on signal which renders the switchable circuit conductive only during the existence of the sinusoidal calling signal, the improvement including in combination:

amplitude modulator means included in the transmitter and having input, output and control terminals, said input terminal being connected to the output of the signal generator, said output terminal being connected to the master modulator of the transmitter;

auxiliary information supply means included in the transmitter providing a rectangular information signal to the control terminal of said amplitude modulator means so that the amplitude of the sinusoidal calling signal is selectively changed between the first magnitude and a second magnitude in response to said rectangular information signal thereby forming an amplitude modulated information signal;

second demodulator means included in each of the receivers and connected to the output of the first demodulator, said second demodulator means being responsive to said amplitude modulated information signal to provide said rectangular information signal at the output terminal thereof; and data utilization means connected to said output terminal of said second demodulator means, said data utilization device being adapted to make use of said rectangular information signal.

11. The combination of claim 10 wherein said amplitude modulator means is comprised of:

an electron control device having first, second and third electrodes;

first circuit means coupling said first electrode of said electron control device to said input terminal of said amplitude modulator means and to said output terminal of said amplitude modulator means;

second circuit means connecting said second electrode of said electron control device to said control terminal of said amplitude modulator means; and third circuit means coupling said third electrode of said electron control device to a reference potential, said electron control device being rendered conductive and nonconductive in response to said rectangular information signal thereby causing said reference potential to be alternately connected and disconnected to and from said first circuit means, said first circuit means cooperating with said reference potential to form a voltage divider so that the amplitude of the sinusoidal calling signal varies between said first and second magnitudes in response to said rectangular information signal.

12. The combination of claim 10 wherein said second demodulating means includes:

amplifying means having input, control and output terminals, said input terminal of said amplifying means being connected to the first demodulating means so that said amplitude modulated information signal is applied to said amplifying means; and automatic gain control means having an input terminal connected to said output terminal of said amplifying means and an output terminal connected to said control terminal of said amplifying means; said automatic gain control means being responsive to said first and second magnitudes of the amplitude of said amplitude modulated information signal to develop at said output terminal thereof the rectangular information signal provided by said auxiliary information supply means of the transmitter.

13. The calling system of claim 1 wherein said amplitude of said second value of said sinusoidal calling signal is on the order of 75 percent of said amplitude of said first value to minimize the creation of spurious emanations from the transmitter.

14. In a calling system having a transmitter which provides a composite signal made up of an information component and an amplitude modulated calling signal, the amplitude modulated calling signal being made up of a sinusoidal calling signal having a chosen frequency which is modulated by a rectangular calling signal having a chosen repetition rate, and a decoder means associated with a plurality of normally silent receivers, the decoder means being responsive to a particular amplitude modulated calling signal to render a selected receiver operative, the decoder means being comprised of:

first demodulating means included in each of the receivers, each of said first demodulating means providing said amplitude modulated calling signal at an output terminal thereof;

frequency selective means included in each of the receivers, each of said frequency selective means being responsive to a sinusoidal calling signal of a predetermined frequency and having an input terminal coupled to said output terminal of one of said first demodulating means and an output terminal;

said frequency selective means providing a first control signal at said output terminal thereof only in response to said frequency of said chosen sinusoidal calling signal being substantially equal to the predetermined frequency to which said frequency selective means responds;

second demodulating means included in each of the receivers, each of said second demodulating means having an input terminal connected to said output terminal of one of said first demodulating means and an output terminal; each of said second demodulating means being responsive to said amplitude modulated calling signal to provide said chosen rectangular calling signal at its output terminal;

repetition rate selective means included in each of the receivers, each of said repetition rate selective means being responsive to a predetermined repetition rate and having an input terminal connected to said output terminal of one of said second demodulating means and an output terminal, said repetition rate selective means providing a second control signal at said output terminal thereof only in response to said repetition rate of said chosen rectangular calling signal being substantially equal to said predetermined rate; and gate means included in each of the receivers each of said gate means having a first input terminal connected to said output terminal of one of said frequency selective means, a second input terminal connected to said output terminal of one of said repetition rate selective means, and an output terminal, said gate means being responsive to the simultaneous existence of said first and second control signals to provide a turn-on signal which enables the selected normally silent receiver to reproduce the information signal.

15. The calling system of claim 14 wherein said second demodulating means includes:

an amplifier means having input, output and control terminals, said input terminal being connected to said output of said first demodulating means so that said amplitude modulated calling signal is applied thereto; and automatic gain control means having an input terminal connected to said output terminal of said amplifier means and an output terminal connected to said control terminal of said amplifier means, said automatic gain control means being responsive to said first and second values of the amplitude of said amplitude modulated calling signal to provide said chosen rectangular calling signal at said output terminal thereof.

* * * * *